United States Patent [19]
Schwarz

[11] 3,953,779
[45] Apr. 27, 1976

[54] ELECTRONIC CONTROL SYSTEM FOR EFFICIENT TRANSFER OF POWER THROUGH RESONANT CIRCUITS

[76] Inventor: Francisc Carol Schwarz, 18339 Timber Lane, Fairview Park, Ohio 44126

[22] Filed: May 30, 1974

[21] Appl. No.: 474,788

[52] U.S. Cl. .................. 321/2; 321/19; 321/45 R
[51] Int. Cl.² .......................... H02M 3/315
[58] Field of Search ........... 321/2, 18, 19, 45 R, 321/45 ER

[56] References Cited
UNITED STATES PATENTS

| | | | |
|---|---|---|---|
| 3,303,406 | 2/1967 | Bedford | 321/45 R |
| 3,346,798 | 10/1967 | Dinger | 321/19 |
| 3,593,103 | 7/1971 | Chandler et al. | 321/2 |
| 3,614,587 | 10/1971 | Schwarz | 321/2 |
| 3,659,184 | 4/1972 | Schwarz | 321/2 |
| 3,663,940 | 5/1972 | Schwarz | 321/2 |
| 3,760,258 | 9/1973 | Percorini et al. | 321/45 R |
| 3,781,634 | 12/1973 | Jessee | 321/45 R |

*Primary Examiner*—A. D. Pellinen
*Attorney, Agent, or Firm*—Woodling, Krost, Granger & Rust

[57] ABSTRACT

A device to control the transfer of energy via resonant circuits from a D.C. source of electric energy to a load. The device confines the resonant currents to near the magnitude needed to accomplish this controlled transfer within prescribed limits, independent of variations of the source voltage or of the load. The voltage stresses imposed on the individual circuit components are contained accordingly. An electronic control system governs the electronic power switches to conform to a pattern of operation which confines the average currents in the resonant circuits to preset levels and therewith confines the series capacitor voltage amplitude to predictible and restricted magnitudes. The rms content of the resonant current is restricted to predictible and moderate deviations from a design norm for specified conditions of system operation.

16 Claims, 3 Drawing Figures

ELECTRONIC CONTROL SYSTEM FOR EFFICIENT TRANSFER OF POWER THROUGH RESONANT CIRCUITS

BACKGROUND OF THE INVENTION

This invention relates to power converters, and more particularly, to the kind known as series capacitor inverter-converters.

This type of converter utilizes internally series resonant circuits which link a source of D.C. energy with one or more loads simultaneously. These loads may require A.C. or D.C. power or a combination of both. The source energizes series resonant circuits in a succession of discrete time intervals. The oscillations of these series resonant circuits are limited to one half cycle duration since the circuits include controlled unidirectional electronic switches, such as thyristors. These devices are brought into a state of conduction following a trigger signal when the other conditions for forward current flow in this circuit exist. The thyristors block, however, current flow in the reverse direction; the resonant circuit comes, therefore, to rest after one half cycle of its natural period of oscillation. Triggering of a second appropriately placed thyristor after elapse of some time interval causes the occurrance of another half cycle of resonant oscillation. After some time the first thyristor is triggered, and the process goes on in the described manner.

Energy is extracted from the resonant circuit during each of the described cycles via a transformer. An output filter smoothes the succession of pulses to accomodate the load requirements. The described extraction of energy has a damping effect on the, otherwise, almost undamped oscillations in the series resonant circuits. The current amplitude in these circuits depends on the (1) D.C. voltage of the source of energy, (2) the damping caused by the load and (3) the quality Q of the entire resonant circuit. If any of these three aspects of the oscillating system departs from an intended and workable state, then the circuit will either (a) cease to oscillate for want of sufficient acceptance of energy, or (b) its current amplitude may increase to levels where the ohmic losses in the circuit could become prohibitive and, possibly, damaging because of the ensuing heating effects, or the circuit elements could be destroyed by excessive voltage stresses.

The above described conditions are prevalent in the discussed kind of power converters, especially if the converter is required to supply constant power to a load during appreciable changes of the D.C. source voltage. An analogous condition develops when the load voltage is appreciably varied at a time when the D.C. supply voltage is kept constant.

SUMMARY OF THE INVENTION

This invention provides series capacitor inverter-converters with the capability to supply electric energy to a load according to prescribed time varying voltage or current levels, independent of voltage variations of the primary source of electric energy. This converter characteristic is provided in a way which facilitates reliable and efficient operation.

Accordingly, it is the objective of the present invention to improve systems which employ resonant circuits for purpose of transfer of energy from a source to one or more loads.

It is a further object of this invention to improve series capacitor inverter-converters.

It is a further object of this invention to retain a favorable electric efficiency of operation without regard to changes of the voltage of the D.C. source of energy within design limits and without regard to controlled changes of the converter output voltage, again, within design limits.

It is a further object of the invention to improve the reliability of operation of the series capacitor inverter-converters by limiting the electric stresses imposed on the component parts and by keeping the resonant currents within bounds by nominally nondissipative means.

It is yet another object of the invention to improve the reliability of operation of this kind of inverter-converters by avoiding any auxiliary switching elements for purpose of controlling the main currents in the primary circuits.

BRIEF DESCRIPTION OF THE DRAWINGS

The above mentioned and other objects of the invention will become apparent from the following detailed description of the invention when read in conjunction with the annexed drawings in which.

DESCRIPTION OF THE PREFERRED EMBODIMENT

Figure 1:
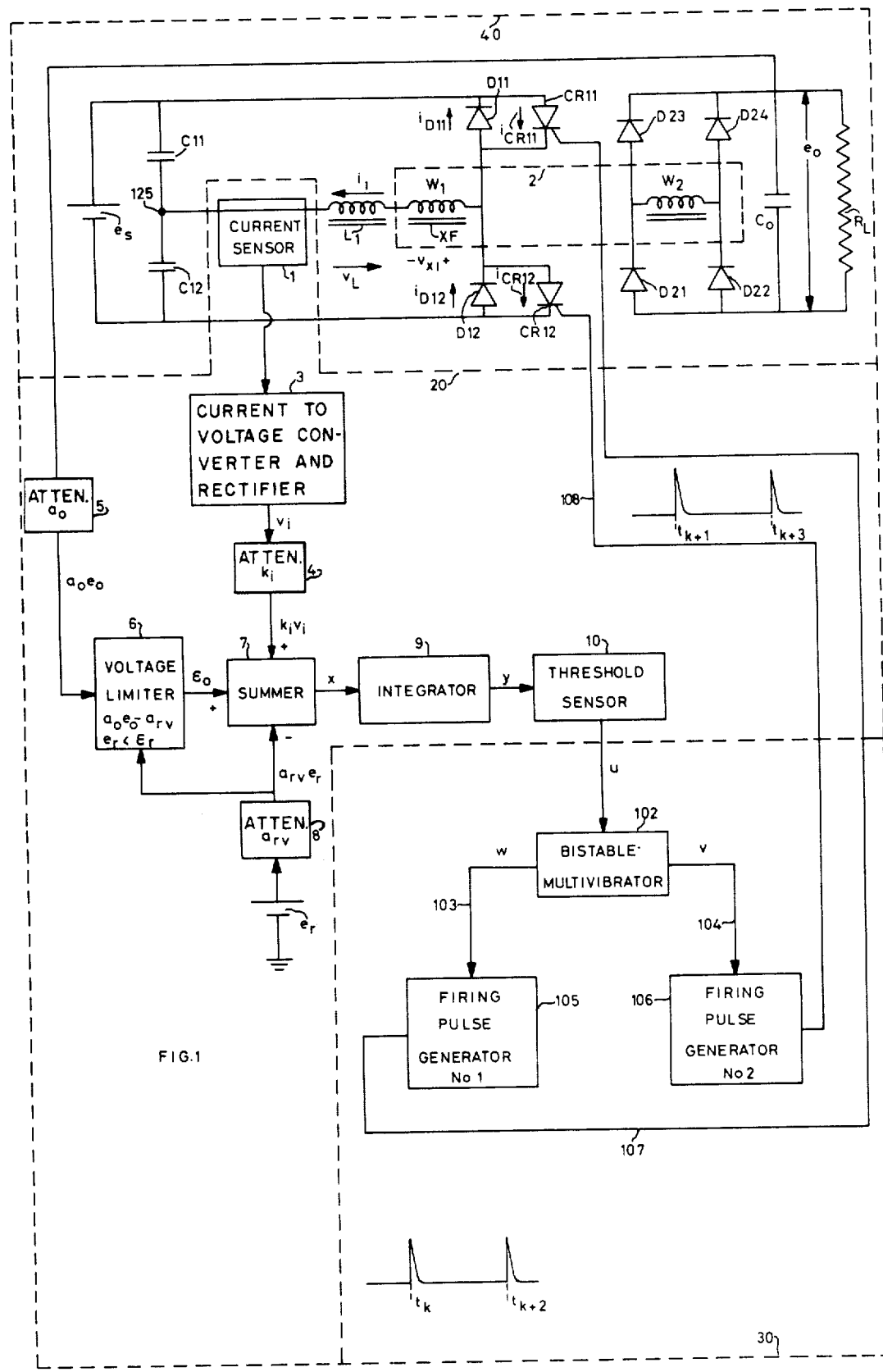
FIG. 1 is the schematic diagram of a common frequency modulated series capacitor inverter-converter, governed by a control system for containment of the energy exchange between the source of electric energy, the series resonant circuits, and the load; the schematic diagram in FIG. 1 represents the preferred embodiment of the invention.

In the drawings, inductors, capacitors, diodes, controlled rectifiers and resistors are designated by conventional symbols and by reference characters L, C, CR, and R with various subscripts. In the specification and claims the reference characters for inductors, capacitors, controlled rectifiers and resistors may also be used as algebraic symbols to represent the inductance in Henrys, the capacitance in Farads, and the resistance in Ohms of the several parts. In each case the sense of the usage will be clear from the context.

The invention will be described as it is applied with a series capacitor inverter-converter as shown in FIG. 1. However, the invention is not restricted to this use. It is readily applied to other types of systems which transfer energy from an electric source to a load mechanism via a resonant circuit. This load can be an electric or an electro-mechanical system. Series capacitor inverter-converters are well known in the art. See for example: U.S. Pat. No. 3,663,940, 1972, Bedford, B.D. and Hoft, R.G., "Principles of Inverter Circuits", Wiley, New York, 1964.

Referring now, specifically, to FIG. 1: the power circuit of the common frequency modulated series capacitor inverter-converter contained within block 40 is exactly the same as described in the first above named reference, except for the addition of diode D11 with its anode connected to the cathode of controlled rectifier CR11 and the cathode of D11 connected to the anode of CR11; furthermore, the addition of diode D12 connected in exactly the same manner to controlled rectifier CR12. The portion of the control system presented in block diagram form and identified as block 30 in FIG. 1 and its function to energize the gates of controlled rectifiers CR11 and CR12, respectively, is again, exactly the same as the one described in the first above named reference.

However, the input signal u which is used to trigger the bistable multivibrator 102 is devised in a different manner than the corresponding signal described in the first of the above named references. Operation of the control system contained in block 20 and its integration with the system components which were just described and contained in blocks 30 and 40, respectivly, is described in the following.

Figure 2:
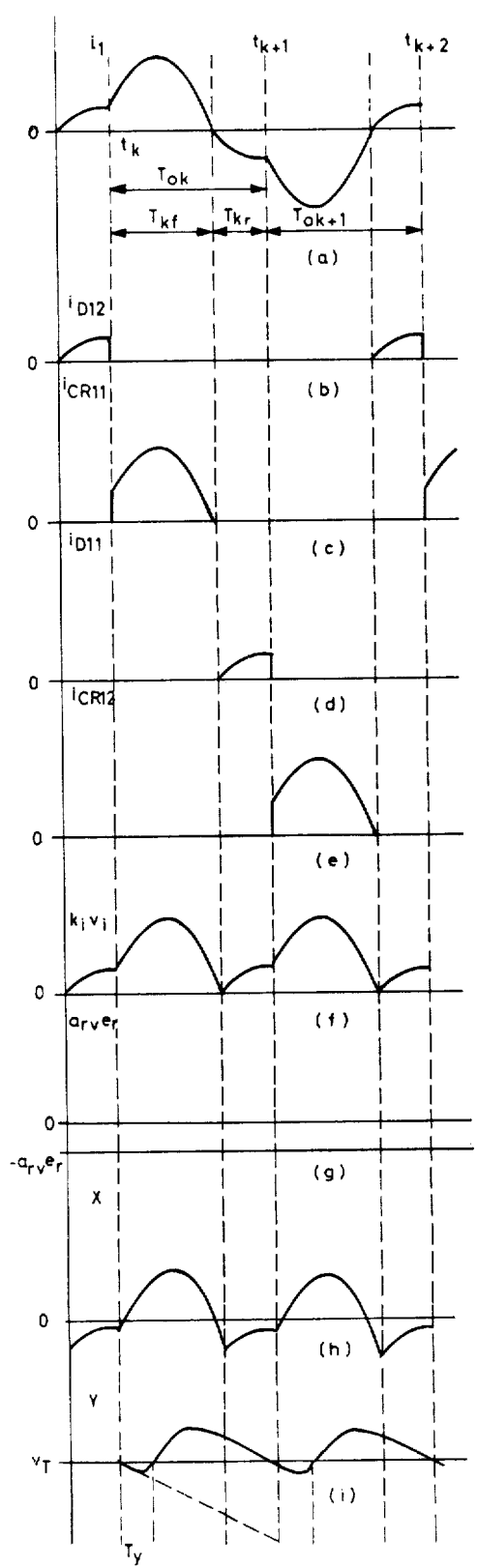
FIGS 2 (a) through 2 (q) show critical voltage and current wave forms in the power and in the control systems of FIG. 1, useful in the explanation of the invention.
Figure 2:
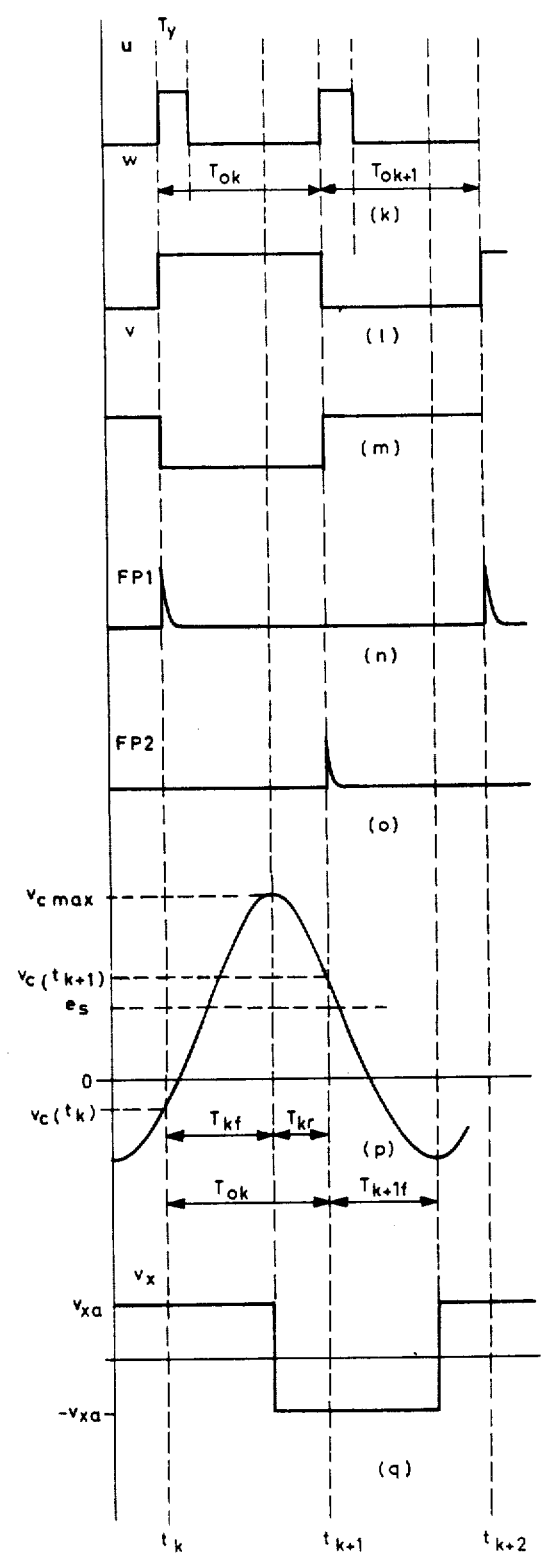

The voltage $v_c$ on junction 125 of capacitors C11 and C12 is at time $t = t_k$ shown as $v_c(t_k)$ on FIG. 2($p$); a current $i_1(t_k)$ shown in FIG. 2($a$) is flowing in the resonant circuit consisting of capacitor $C_t = C11 + C12$, inductor $L_1$, transformer XF and diode D12; the current $i_{D12}$ in diode D12 is also shown in FIG. 2($b$). Firing pulse generator No. 1 identified by number 105 emits a trigger pulse shown in FIG. 2($n$) at the same time $t = t_k$ and energizes thyristor CR11. The causal relationship of these events will become clear in the course of the continuation of this description.

Thyristor CR11 closes in response to above described trigger pulse; current $i_1$ is now transferred from diode D12 to thyristor CR11 as illustrated in FIGS. 2($b$) and 2($c$). A new portion of $i_1$ is thus generated: an initial potential $$v_L(t_k) = e_s - v_c(t_k) - v_{xa} \qquad (1)$$

is imposed on inductor $L_1$ where $v_{xa} = e_o/a$
$e_o$ = the d.c. output voltage of the system
$a = N_2/N_1$
$N_i$ = the number of turns on winding $W_i$ on transformer XF enclosed by block 2 in FIG. 1 where $i$ is a mathematical index which can assume any positive integer for example:
$N_1$ = the number of turns on winding $W_1$,
$N_2$ = the number of turns on winding $W_2$.
$v_c$ = the voltage at the junction 125 of capacitors C11 and C12 with respect to the reference node, being the negative terminal of source $e_s$ of the primary power circuit; $v_c(t_k)$ is shown as a negative value in FIG. 2($p$), but this is not necessarily so.

The resonant current $i_1$ runs its course during the time interval $T_{kf}$ for $t_k < t < t_k + T_{kf}$; the capacitor voltage $v_c$ defined above and illustrated in FIG. 2($p$) continues to rise until the end of the resonant interval $T_{kf}$ when $v_c = v_{c\ max}$ at $t = t_k + T_{kf}$. Current $i_1(t_k + T_{kf}) = 0$ and thyristor CR11 opens for lack of current. Capacitor $C_1$ as defined above now discharges through the resonant path $L_1$, XF and diode D11. The ensuing resonant current for $t > t_k + T_{kf}$ is caused by imposing an inductor $L_1$ an initial potential $$-v_L(t_k + T_{kf}) = v_c(t_k + T_{kf}) - e_s - v_{xa} \qquad (2)$$

Evidently is $$|v_L(t_k + T_{kf})| < v_L(t_k) \qquad (3)$$

because relation (1) described the initial condition of $v_L$ for a resonant current $i_1$ in which the capacitor voltage $v_c$ starts near zero and would swing about the source voltage $e_s$ while relation (2) describes the initial condition of $v_L$ for a resonant current in which the capacitor voltage $v_c$ would swing not about the system's reference node, but about the nearer line voltage potential $e_s$. In both cases the resonant voltage waveform $v_c$ is damped by the extraction of energy from the resonant circuits via transformer XF.

Firing generator No. 2, also identified by number 106 emits at time $t = t_k + T_{ok}$ a trigger pulse as illustrated in FIG. 2($o$) which energizes thyristor CR12; current $i_1$ is then commutated from diode D11 to Cr12 as illustrated in FIGS. 2($d$) and ($e$). The thus initiated phase of the resonant current $i_1$ is caused by imposing on inductor $L_1$ an initial potential $$-v_L(t_k + T_{ok}) = v_c(t_{k+1}) - v_{xa} \qquad (4)$$

where evidently $$|v_L(t_k + T_{ok})| = |v_L(t_k)| \qquad (5)$$

and $$|v_L(t_{k+1} + T_{k+1f})| = |v_L(t_k + T_{kf})| \qquad (6)$$

when the reasoning to arrive at relation (2) is continued. From relations (5) and (6) it follows that during the time interval $$t_k < t < t_{k+1}$$

is $$i_1 = -i_1$$

for $$t_{k+1} < t < t_{k+2} \qquad (7)$$

provided that relations (5) and (6) hold, which are again based on relations (1) through (4). An electronic mechanism which will provide the firing pulses illustrated in FIGS. 2($n$) and 2($o$) so that relations (5) and (6), and therewith relation (7) will hold under conditions of cyclic stability and for $de_o/dt = dR_L/dt = 0$ for $t_k < t < t_{k+2}$ is described in the following.

Current sensor 1 transfers a replica of $i_1$ to block 3 in which this signal is rectified and transformed into a voltage signal $v_i$; this signal $v_i$ is attenuated to $k_1v_i$ by attenuator 4 as shown in FIG. 2($f$) and then enters summer 7. A voltage reference source $e_r$ is modified by a controllable attenuator 8 with the indicated negative polarity. Summer 7 forms the algebraic sum $$x = k_1v_i - a_{rr}e_r \qquad (8)$$

shown in FIG. 2($h$) which is fed into integrator 9. The integral $y$ of $x$ is given by $$y(t) = v_T + \int_{t_k}^{t} (k_1v_i - a_{rr}e_r)dt \qquad (9)$$

where $v_T$ is an arbitrarily chosen constant which is defined below.

This integration process starts at $t = t_k$ when $y(t_k) = v_T$, being the voltage detection level of a threshold detector 10; the waveform $y(t)$ is illustrated in FIG. 2(i). The integral $y(t)$ follows a curve that resembles the named illustration; the magnitude of $a_{rv}e_r$ is so chosen that $$\int_{t_k}^{t_k + T_{ok}} (k_1v_i - a_{rv}e_r)dt = 0 \tag{10}$$

If relation (10) holds then is the average $i_{lav}$ of current $i_l$, given by $$i_{lav} = \frac{1}{T_{ok}} \int_{t_k}^{t_k + T_{ok}} i_l dt = k_r a_{rv} e_r \tag{11}$$

where $k_r$ accounts for all constants linking the current $i_l$ to $a_{rv}e_r$. Thus $i_{lav}$ becomes a controllable function of $a_{rv}$ for fixed $e_r$ and $k_r$.

Timing of the firing pulses which satisfies relation (11) is illustrated in FIGS. 2(n) and (o) and is mechanized in the following manner: threshold sensor 10 emits a positive signal $u$ during the time interval $t_k < t < t_k + T_y$ and is zero when $y > v_T$. Thus the output signal $u$ of 10 appears as illustrated in FIG. 2(k). The bistable multivibrator 102 is triggered by the positive leading edges of the pulses shown in FIG. 2(k). The output $w$ of 102 which energizes the firing pulse generator No. 1 identified as block 105 is shown in FIG. 2(l); the output $v$ of 102 which energizes the firing pulse generator No. 2 and identified as block 106 is shown in FIG. 2(m). The rising edges of the pulses shown in 2(l) and (m), respectively, energize the respective firing pulse generators and cause the trigger signals FP1 illustrated in FIG. 2(n) and FP2 illustrated in FIG. 2(o), respectively. Trigger signals FP1 are conveyed to the gate of thyristor CR11; trigger signals FP2 are conveyed to the gate of thyristor CR12, as indicated before.

Triggering of CR11 and of CR12 occurs in alternating succession at the instants of time $t_k, t_{k+1}, t_{k+2}$, and so on, and is the primary cause for the flow of current $i_l$ in the manner described above. Satisfaction of relation (10) guarantees the validity of relation (11) and provides means to determine $i_{lav}$ by appropriate choice of $a_{rv}$.

Control of $i_{lav}$ as described above has the effect that:

$$\int_{t_k}^{t_k + T_{ok}} idt = C_1 \int_{t_k}^{t_k + T_{ok}} (dv_c/dt)dt = C_1[v_c(t_k + T_{ok}) - v_c(t_k)] \tag{12}$$

Relation (11) and (12) combine to $$v_c(t_k + T_{ok}) - v_c(t_k) = k_r a_{rv} e_r T_{ok}/C_1 \tag{13}$$

If a ratio $T_{kr}/T_{ok\ min}$ of the time interval $T_{kr}$ during which any of the diodes conducts and the shortest interval $T_{ok\ min}$ of one cycle of operation of the described system is established so that $$T_{ok\ min} < \pi(1 + T_{kr}/T_{ok\ min}) \tag{14}$$

and $$T_{ok\ max} < 2\pi \tag{15}$$

by virtue of the resonant character of the circuits, then is $$T_{ok\ max}/T_{ok\ min} \lesssim 2/(1 + T_{kr}/T_{ok\ min}) \tag{16}$$

Time interval $T_{kr} > t_{off}$, being the turn off time of thyristors.

The capacitor voltage given at times $t_k$ and $t_{k+1}$ by relation (13) is therefore confined to variations of no more than indicated by relation (16). These voltages impose moderate stresses on capacitors C11, C12 and on inductor $L_1$. The controlled rectifiers are at no time exposed to substantially larger voltage stresses than the ones imposed by the source $e_s$ because of the presence of diodes D11 and D12.

The system functions in the above described manner as a current source. Addition of a feedback loop is necessary to transform it into a current limiting voltage source : the voltage signal $e_o$ is acquired at the positive output terminal, then modified by a controllable attenuator 5 to $a_oe_o$ and applied to an input terminal of block 6 which performs a voltage limiting function. The above described signal $a_{rv}e_r$ is applied to a second input terminal to block 6. The signal $$a_oe_o = a_{rv}e_r \tag{17}$$

when $$R_L i_{lav} N_1/N_2 = E_o \tag{18}$$

where $E_o$ is the nominal value of the output voltage $e_o$. If relation (17) is not satisfied, then block 6 sends an error signal $\epsilon_o = a_oe_o - a_{rv}e_r$ in the previously described summer 7. When $e_o > E_o$, then is $\epsilon_o > 0$ and is added to the signal $k_1v_i$ thus causing a reduction of $i_{lav}$ and correcting the output voltage error, as well known to those skilled in the art. The converse takes place when $e_o < E_o$. However signal $\epsilon_o$ is limited to a predetermined value $\epsilon_r > \epsilon_o$. Block 6 limits its output signal to $$a_oe_o - a_{rv}e_r = \epsilon_o < \epsilon_r \tag{19}$$

Figure 3:
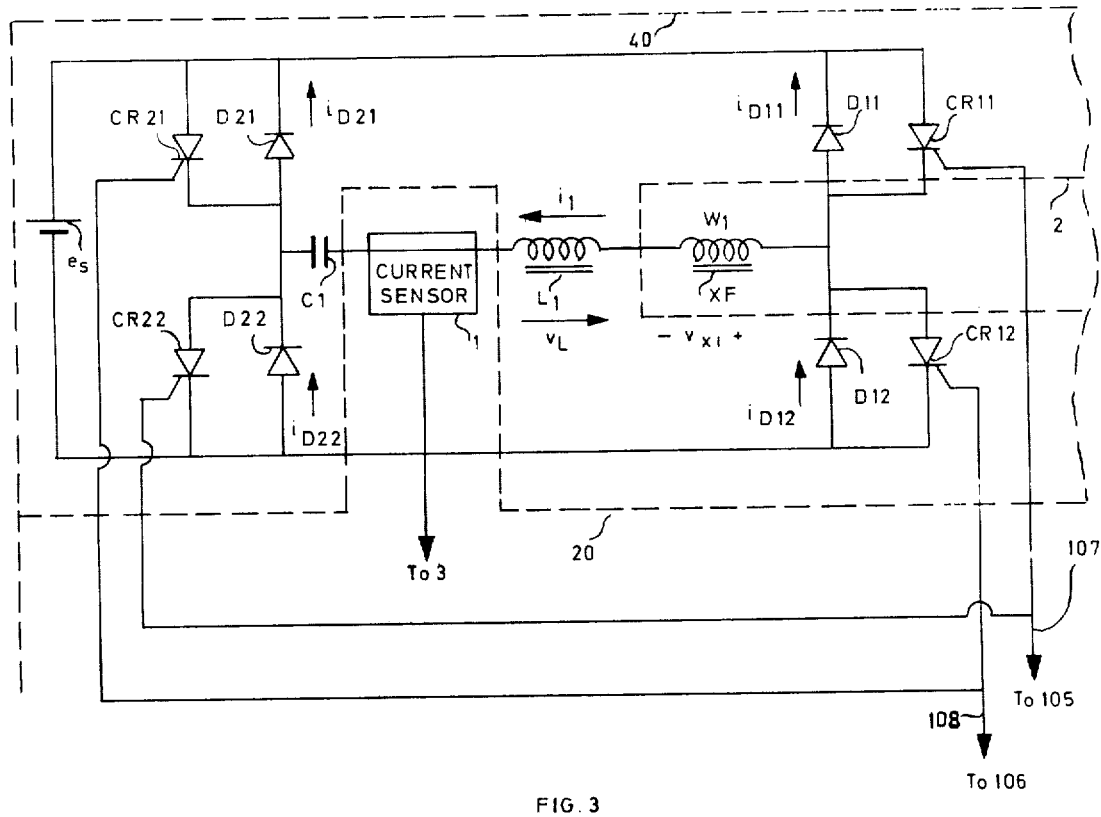
FIG. 3 is a schematic diagram of a variation of the converter shown in FIG. 1.

The implementation of voltage limiting devices for the described purpose is well known to those skilled in the art. The system as just described is used as voltage source with a preset maximum current limiting property. Adjustment of the controllable attenuators $a_{rv}$ and $a_o$ provides the desired current and voltage levels, respectively. FIG. 3 is a full-wave bridge configuration of the half-wave bridge shown in FIG. 1. The circuit comprises third and fourth controlled unidirectional current conducting electronic switches CR22 and CR21 and third and fourth diodes D22 and D21. The third and fourth diodes, D22 and D21 are connected individually and antiparallel to the third and fourth switches CR22 and CR21 in the same manner as the first and second diodes D11 and D12 are connected to the first and second electronic switches CR11 and CR12. Means shown as conductor 107 couples the output of the first firing pulse generator 105 to the control terminals of first switch means shown as the first and third switches CR11 and CR22. The first and third switches CR11 and CR22 are connected in series with the resonant circuit including C1 and $L_1$ of the inverter. Means shown as conductor 108 couples the output of the second firing pulse generator 106 to the control terminals of second switch means shown as the second and fourth switches CR12 and CR21. The second and fourth switches CR11 and CR21 are connected in series with the resonant circuit including C1 and L₁ of the inverter. Accordingly, conduction of the first and third electronic switches CR11 and CR22 provide a current path through components CR11, W₁, L₁, current sensor 1, C1 and CR21. Conduction of the second and fourth electronic switch CR12 and CR21 provides a current path through components CR21, C1 current sensor 1, L₁, W₁, and CR12. Diodes D11 and D22 provide discharge of capacitor C1 in one direction whereas diode D12 and D21 provide discharge of capacitor C1 in the opposite direction. The use of the term electronic switch includes, thyristers, SCR's transistors and other solid state and vacuum tube gates as well known in the art. The above described system was presented in form of a half bridge configuration. The same system with the same properties can be implemented in form of a full bridge configuration containing two pairs of controlled switching elements and antiparallel diodes which act in pairs exactly as described for the single switching elements. Half and full bridge configurations of converters are well known to those skilled in the art and are described in the second above cited reference Bedford and Hoft (pp. 191 and 206).

What is claimed is:

1. A controllable converter device for providing electrical current to a load, comprising in combination:
   a power source;
   first and second switch means;
   capacitor means;
   a first series resonant circuit comprising said first switch means connected in series with the load and said capacitor means;
   a second series resonant circuit comprising said second switch means connected in series with the load and said capacitor means;
   means connecting said first and second resonant circuits across said power source;
   control means enabling alternate conduction of said first and second switch means to provide alternate direction load current from said power source to the load during alternate charging of said capacitor means;
   said alternate charging of said capacitor means providing alternate potentials which oppose said alternate conduction of said first and second switch means thereby alternately terminating conduction of said first and second switch means;
   and means connected to said first and second series resonant circuit for enabling discharge of said capacitor means between said alternate direction load currents to limit the voltage of said capacitor means.

2. A converter as set forth in claim 1, wherein said means connected to said first and second series resonant circuits for enabling discharge of said capacitor means includes diode means.

3. A converter as set forth in claim 2, wherein said first and second switch means are unidirectional and said diode means includes a first and a second diode connected in an antiparallel configuration with said first and second unidirectional switch means, respectively.

4. A converter as set forth in claim 1, wherein said capacitor means includes a first and a second capacitor;
   said first capacitor being connected in said first series resonant circuit,
   said second capacitor being connected in said second series resonant circuit,
   and said first and second capacitors being connected in series across said power source.

5. A converter as set forth in claim 1, wherein said switch means include thyristors.

6. A converter as set forth in claim 1, wherein said switch means includes a solid state device.

7. A converter as set forth in claim 1, wherein said control means includes means for determining the voltage on said capacitor means in accordance with the current flow thereto;
   and means enabling the next alternate conduction of said first and second switch means when said voltage on said capacitor means is below a preselected voltage level.

8. A converter as set forth in claim 7, wherein said control means includes means for sensing the voltage across the load,
   and means for varying said preselected voltage level in accordance with variations of said voltage across the load.

9. A converter as set forth in claim 1, wherein said capacitor means alternately charges to provide alternate potentials on said capacitor means to oppose said power source to alternately terminate conduction of said first and second switch means upon completion of approximately one-half cycle of resonant oscillation.

10. A converter as set forth in claim 1, wherein said means connected to said first and second series of resonant circuits for enabling discharge of said capacitor means to limit the voltage thereof includes reducing the voltage of said capacitor means.

11. A converter as set forth in claim 1, wherein said control means includes current sensor means for providing a current sensor output in accordance with the current flow relative to said capacitor means;
    a current reference output;
    means providing a summing output of said current sensor output and said current reference output;
    integrator means for integrating said summing output;
    and means receiving the output of said integrator means for activating conduction of said first and second switch means to substantially control the average current for an average cycle of oscillation.

12. A converter as set forth in claim 1, wherein said control means includes current sensor means for providing a current sensor output in accordance with the current flow to said capacitor means;
    integrator means for integrating said current sensor output to determine the voltage on said capacitor means in accordance with the current flow thereto;
    and means for enabling the next alternate conduction of said first and second switch means upon detecting a given signal level of said integrator means indicating that the voltage on said capacitor means is below a preselected voltage level.

13. A converter as set forth in claim 1, wherein said control means includes current sensor means for providing a current sensor output in accordance with the current flow to said capacitor means;
    voltage sensor means for providing a voltage sensor output in accordance with the voltage across the load;
    a summing device for providing a summing output from the combination of said current sensor output and said voltage sensor output;

integrator means for integrating said summing output to provide a signal in relation to the voltage on said capacitor means which is modified by variations in the voltage across the load;

a threshold sensor providing a threshold output upon detecting a given signal level of said integrator means indicating that the voltage on said capacitor means is below a preselected voltage level;

and bistable means responsive to said threshold output to alternately enable conduction of said first and second switch means upon a threshold output.

14. A controllable converter device for providing electrical current to a load, comprising in combination:

a power source;

a first and second pair of unidirectional switches;

a capacitor;

a first series resonant circuit comprising said first pair of switches connected in series with the load and said capacitor;

a second series resonant circuit comprising said second pair of switches connected in series with the load and said capacitor;

means connecting said first and second resonant circuits across said power source;

control means establishing alternate conduction of said first and second pairs of switches providing alternate direction load current from said power source to the load during alternate charging of said capacitor;

said alternate charging of said capacitor providing alternate potentials on said capacitor which oppose said alternate conduction of said first and second pairs of switches thereby alternately terminating conduction of said first and second pairs of switches;

and diode means connected to said first and second resonant circuits for enabling discharge of said capacitor between said alternate direction load current to limit the voltage applied to said capacitor.

15. A converter as set forth in claim 14, wherein said capacitor and the load are interposed between each pair of said first and second unidirectional switches.

16. A converter as set forth in claim 14 wherein said diode means connected to said first and second resonant circuits includes a first and a second pair of diodes respectively connected in an anti-parallel configuration with said first and second pair of unidirectional switches.

* * * * *